United States Patent
Sameshima et al.

(10) Patent No.: US 6,877,099 B2
(45) Date of Patent: Apr. 5, 2005

(54) WIRELESS DISPLAY SYSTEM OPERABLE IN POWER SAVING OPERATION MODE AND CONTROL METHOD FOR CONTROLLING THE SYSTEM

(75) Inventors: Osamu Sameshima, Moriguchi (JP); Osamu Kamo, Kobe (JP); Masaki Mukai, Nishinomiya (JP); Atsushi Tanaka, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 602 days.

(21) Appl. No.: 09/843,031

(22) Filed: Aug. 17, 2001

(65) Prior Publication Data

US 2003/0037265 A1 Feb. 20, 2003

(51) Int. Cl.⁷ ................................................. G06F 1/32
(52) U.S. Cl. ..................................... 713/324; 713/320
(58) Field of Search ............................... 713/300, 320, 713/323, 324

(56) References Cited

U.S. PATENT DOCUMENTS 6,005,533 A * 12/1999 Wilson ........................ 345/2.3
6,301,674 B1 * 10/2001 Saito et al. ................. 713/340
6,633,759 B1 * 10/2003 Kobayashi ................... 455/419
6,650,305 B1 * 11/2003 Havey et al. .................. 345/8
2002/0041262 A1 * 4/2002 Mukai et al. ................. 345/30
2002/0166127 A1 * 11/2002 Hamano et al. ............ 725/105

FOREIGN PATENT DOCUMENTS

JP          10-133788          5/1998

* cited by examiner

Primary Examiner—Dennis M. Butler
(74) Attorney, Agent, or Firm—McDermott Will & Emery LLP

(57) ABSTRACT

A wireless display system including a computer and a wireless display wireless-communicating with each other is provided. In the system, the wireless display automatically shifts back from a power saving operation mode to an ordinary operation mode. The computer includes an object event registering/monitoring unit and a wireless-communication unit. The When detecting a specified event which occurs in the computer, the computer notifies the events to the wireless display with the wireless-communication unit, and turns on the wireless display to shift the display unit automatically from the power saving operation mode to the ordinary operation mode. The wireless display monitors inputting data through a touch panel unit. When no data is input for a predetermined time, a display unit is turned off. Thereby, the wireless display automatically shifts form the ordinary operation mode to the power saving operation mode.

29 Claims, 1 Drawing Sheet

WIRELESS DISPLAY SYSTEM OPERABLE IN POWER SAVING OPERATION MODE AND CONTROL METHOD FOR CONTROLLING THE SYSTEM

FIELD OF THE INVENTION

The present invention relates to a wireless display system having a computer and a portable data terminal equipped with an inputting unit and a displaying unit (referred to as a wireless display hereinafter), where the computer is remotely controlled by the wireless display over wireless communications.

BACKGROUND OF THE INVENTION

As the computer technologies for a hardware and software have significantly been advanced, most of portable data terminals have a performance and mobility improved. The portable data terminals are now widely used by a mobile business person, and used for novel application proposed day by day.

The portable data terminal is hence required to reduce their overall dimensions and weight and particularly improve and enhance a power-saving function, i.e., a less energy consumption. Saving the power consumption contributes reducing a battery size, thus reducing both an overall size and a weight of the portable data terminal.

The power saving function may be interpreted by developing a standby state where a power in consumed as little as possible, hence being traded off with a utility. Pursuing the power saving too much makes an activated state and the standby state be switched frequently and creates some drawbacks such as a delay of a response and an intricate operation shifting from the standby state to the action state. The power saving hence requires to determine shifting conditions and power saving levels.

Shifting to the power saving operation mode may be implemented by a power switch of the data terminal operated by a user or by monitoring a non-operation period more than a specified one.

As Japanese Patent Laid-open No.10-133788 discloses, upon being informed that a portable data terminal is turned off, a host computer turns off the computer itself and then shut down an entire system, thus exhibiting a most power saving effect.

Above prior art allows the shifting to the power saving operation mode automatically conducted without any troublesome operation. Both the portable data terminal and the computer are completely turned off and thus reduce the power consumption. However, the user needs to shift the power saving operation mode back to the ordinary operation mode with a user's deliberate operation.

SUMMARY OF THE INVENTION

A wireless display system has a computer and a wireless display wireless-communicating with each other. The computer includes an object event registering/monitoring unit for specifying and monitoring a particular event such as receiving a mail or a certain time on a schedule. The wireless display is notified of that the event occurs. Upon receiving the notice of the event, the wireless display shifts back from a power saving operation mode to a ordinary operation mode where the display is enabled to display data and input data.

The wireless display may monitor an operation through a touch panel unit. If data does not enter a predetermined time, the display judges that a user stops operating the wireless display, and then, the wireless display stops supplying a power to a display screen and shifts from the ordinary operation mode to the power saving operation mode.

Thereby, the system reduces the power consumption with the power saving operation and further, enables the user to start to use the portable data terminal immediately corresponding to the event without any operation by the user.

DETAILED DESCRIPTION OF THE PREFERRED EMBODIMENT

Figure 1:
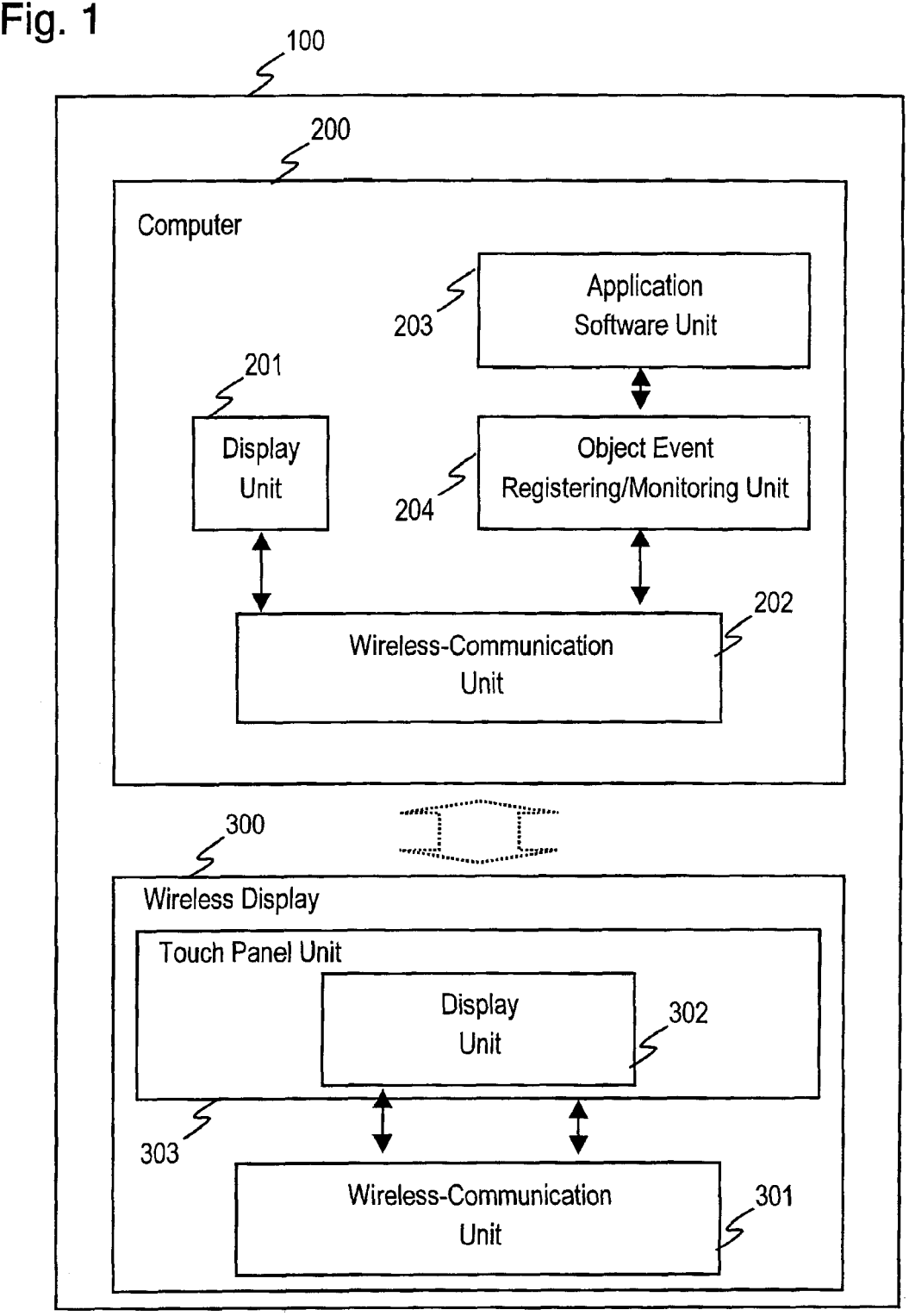
FIG. 1 is a schematic diagram of a wireless display system according to an exemplary embodiment of the present invention.

FIG. 1 is a schematic diagram of a wireless display system according to an exemplary embodiment of the present invention. As shown in FIG. 1, a wireless display system 100 includes a computer 200 and a wireless display 300.

The computer 200 includes a display unit 201, a wireless-communication unit 202, an application software unit 203, and an object event registering/monitoring unit 204.

The display unit 201 is a display of the computer for displaying data in text or graphic forms created in the computer operated by the user. Because the user can acquire the data on the wireless display 300, the display unit 201 may not be implemented by a physical device but a logic block.

The wireless-communication unit 202 receives the data and converts the data to be displayed on the display unit 201 into a protocol form operable in the wireless display. The protocol form of the data is transferred over a wireless-communication to the wireless display 300. It is preferable that the data to be displayed on the display unit 201 stored in a memory (a graphic memory) is extracted with a hardware method. The whole extracted data may not be transferred to the wireless display 300. The system further includes a memory temporarily storing data to be previously displayed, and the computer sends only a difference of the data between the data and data to be previously displayed, and thus reducing data to be transferred. Moreover, the data may be extracted with a system service presented by an OS (for example, BitBlt readout in the Windows) in which data at a specified position on a screen is extracted, and the data. The service exhibits a slow operating speed but allows the circuitry arrangement for accessing the graphic memory with the hardware method to be simplified, hence contributing to reducing a cost.

The application software unit 203 is equivalent to a memory device where processing programs of the computer 200 is stored and thus generates events in response to external demands. The application software unit 203 includes two processing programs: a program for transmitting and receiving Internet mails over a communication network such as a cable LAN or a public telephone network; and a schedule management program for notifying a user of a schedule by data displayed at a scheduled time on the display unit 201.

The object event registering/monitoring unit 204 specifies at least one of two events, i.e., receiving a mail and notifying a schedule, and monitors whether or not the specified event occurs in the application software unit 203. When the event occurs, the unit 204 constructs a protocol form of the data operable in the wireless display 300, delivers the form to the wireless-communication unit 202, and instructs the unit 300 to transmit the form.

The wireless communication unit 202, when being instructed by the object event registering/monitoring unit 204, transmits the protocol form of the data to the wireless display 300. The wireless-communication unit 202 also receives protocol data regarding an operation (a click operation and a position on the touch panel unit) from the wireless display 300 and analyzes the data. The data is simulated as a control operation of a pointing device such as a mouse.

The wireless display 300 includes a wireless-communication unit 301, a display unit 302, and a touch panel unit 303.

The wireless-communication unit 301 transmits a protocol data regarding an operation (a click operation and a position on the touch panel unit) received from the touch panel unit 303. The wireless-communication unit 301 monitors receiving the protocol data of the operation from the touch panel unit. When receiving no data for a certain time, the unit 301 judges that the user stops using the wireless display and turns off the display unit 302, thus shifting the wireless display 300 to the power saving operation mode.

The wireless-communication unit 301 also receives protocol data to be displayed from the wireless-communication unit 202 of the computer 200. After analyzing the data, the unit 301 transfers them to the display unit 302. The wireless-communication unit 301 receives protocol data of events from the wireless-communication unit 202 and analyzes the data. When receiving the data while the display unit 302 is in the power saving operation mode, the unit 301 turns on the display unit 302 and instructs the display unit 302 to display the data form the computer again.

The display unit 302 receives and displays protocol data of the display unit 201 sent from the wireless-communication unit 301.

The touch panel unit 303 is a transparent film-like input device for a pointing operation and a position of the operation by a user and is mounted on the display unit 302. The touch panel unit 303 is operated by the user, and then, the operation (a click operation and a position on the touch panel unit) is converted into protocol data and then transferred to the wireless-communication unit 301.

The operations described above can practically be carried out by programs operable in the computer 200 and the wireless display 300.

According to the embodiment of the present invention, the wireless display of a portable data terminal automatically shifts back from a power saving operation mode to an ordinary operation mode without any operation by a user depending on events which occur asynchronously and uncertainly in a computer.

What is claimed is:

1. A wireless display system comprising:
    a computer including:
        an application software unit;
        an object event registering/monitoring unit for specifying an event and monitoring that the event occurs in said application software unit; and
        a first wireless-communication unit for wireless-transmitting event data when the event occurs; and
    a wireless display including:
        a display unit operable in an ordinary operation mode and a power saving operation mode of which power consumption is smaller than a power consumption of said ordinary operation mode; and
        a second wireless-communication unit for shifting said display unit into the ordinary operation mode upon receiving the event data when said display unit operates in the power saving operation mode.

2. The wireless display system according to claim 1, wherein said application software unit includes an Internet mail transmitter/receiver.

3. The wireless display system according to claim 1, wherein said application software unit includes a schedule register/controller for registering and controlling a schedule.

4. The wireless display system according to claim 1, further comprising a touch panel unit for inputting data, wherein said second wireless-communication unit monitors an inputting operation through said touch panel unit, and said second wireless-communication unit shifts said display unit to the power saving operation mode when no data is input for a predetermined time in the ordinary operation mode.

5. A wireless display wireless-communicating with a computer which transmits event data when a specific event occurs, said wireless display comprising:
    a display unit operable in an ordinary operation mode and a power saving operation mode of which a power consumption is smaller than a power consumption of the ordinary operation mode; and
    a wireless-communication unit for shifting the display unit into the ordinary operation mode upon receiving the event data when said display unit operates in the power saving operation mode.

6. The wireless display according to claim 5, further comprising a touch panel unit for inputting data, wherein said wireless-communication unit shifts said display unit to the power saving operation mode when no data is input through said touch panel unit for a predetermined time in the ordinary operation mode.

7. A computer arranged for wireless-communicating with a data terminal operable in an ordinary operation mode and a power saving operation mode of which power consumption is smaller than a power consumption of the ordinary operation mode, said computer comprising:
    an application software unit;
    an object event registering/monitoring unit for specifying an event and monitoring that the event occurs in said application software unit; and
    a wireless-communication unit for wireless-transmitting event data when the event occurs,
    wherein said data terminal shifts to the ordinary operation mode upon receiving the event data when said data terminal operates in the power saving operation mode.

8. The computer according to claim 7, wherein said application software unit includes an Internet mail transmitter/receiver.

9. The computer according to claim 7, wherein the application software unit includes a schedule register/controller for registering and controlling a schedule.

10. A method of controlling a system including a computer in which a specified event occurs and a data terminal for wireless-communicating with the computer, said method comprising the steps of:
    monitoring that the specified event occurs;
    transmitting event data when the specified event occurs; and
    shifting the data terminal to an ordinary operation mode when the data terminal receives the event data in a power saving operation mode.

11. The method according to claim 10, wherein said step of monitoring that the specified event occurs comprises the sub step of monitoring to receive an Internet mail.

12. The method according to claim 10, wherein said step of monitoring that the specified event occurs comprises the sub step of monitoring a registered schedule.

13. The method according to claim 10, wherein the data terminal includes a display unit, and wherein said step of shifting the data terminal comprises the sub step of shifting the display unit into the ordinary operation mode when the display unit receives the event data in the power saving operation mode.

14. The method according to claim 10, further comprising the step of shifting the data terminal to the power saving operation mode when the data terminal receives no data for a predetermined time in the ordinary operation mode.

15. A method of controlling a wireless display having a display unit and wireless-communicating with a computer transmitting event data when a specified event occurs, said method comprising the steps of:

receiving the event data; and shifting the display unit to an ordinary operation mode upon receiving the event data in a power saving operation mode.

16. The method according to claim 15, further comprising the step of shifting the display unit to the power saving operation mode upon receiving no data for a predetermined time in the ordinary operation mode.

17. A method of controlling a computer for wireless-communing with a data terminal operable in a common operation mode and a power saving operation mode, said method comprising the steps of:

monitoring that a specified event occurs; and transmitting event data when the specified event occurs, wherein the data terminal shifts to the ordinary operation mode upon receiving the event data in the power saving operation mode.

18. The method according to claim 17, wherein said step of monitoring that the specified event occurs comprises the sub step of monitoring to receive an Internet mail.

19. The method according to claim 17, wherein said step of monitoring that the specified event occurs comprises the sub step of monitoring a registered schedule.

20. A program for making a wireless display execute a method of controlling the wireless display, the wireless display having a display unit and wireless-communicating with a computer transmitting an event data when a specified event occurs, said method comprising the steps of:

receiving the event data; and shifting the display unit to an ordinary operation mode upon receiving the event data in a power saving operation mode.

21. The program according to claim 20, wherein said method further comprises the step of shifting the display unit to the power saving operation mode upon receiving no data for a predetermined time in the ordinary operation mode.

22. A recording medium recording a program for making a wireless display execute a method of controlling the wireless display, the wireless display having a display unit and wireless-communicating with a computer transmitting an event data when a specified event occurs, said recording medium being readable by the wireless display, said method comprising the steps of:

receiving the event data; and shifting the display unit to an ordinary operation mode upon receiving the event data in a power saving operation mode.

23. The recording medium according to claim 22, wherein said method further comprises the step of shifting the display unit to the power saving operation mode upon receiving no data for a predetermined time in the ordinary operation mode.

24. A program for making a computer execute a method of controlling the computer, the computer wireless-communicating with a data terminal, the data terminal being operable in an ordinary operation mode and a power saving operation mode, said method comprising the steps of:

monitoring that a specified event occurs; and transmitting event data when the specified event occurs, wherein the data terminal shifts to the ordinary operation mode upon receiving the event data in the power saving operation mode.

25. The program according to claim 24, wherein said step of monitoring that the specified event occurs comprises the sub step of monitoring to receive an Internet mail.

26. A program according to claim 24, wherein said step of monitoring that the specified event occurs comprises the sub step of monitoring a registered schedule.

27. A recording medium recording a program for making a computer execute a method of controlling the computer, the computer wireless-communicating with a data terminal, the data terminal being operable in an ordinary operation mode and a power saving operation mode, said recording medium being readable by the computer, said method comprising the steps of:

monitoring that a specified event occurs; and transmitting event data when the specified event occurs, wherein the data terminal shifts to the ordinary operation mode upon receiving the event data in the power saving operation mode.

28. The recording medium according to claim 27, wherein said step of monitoring that the specified event occurs comprises the sub step of monitoring to receive an Internet mail.

29. The recording medium according to claim 28, wherein said step of monitoring that the specified event occurs comprises the sub step of monitoring a registered schedule.

* * * * *